(12) United States Patent
Pritchard et al.

(10) Patent No.: US 9,168,821 B1
(45) Date of Patent: Oct. 27, 2015

(54) REGENERATIVE ENERGY SYSTEM

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/600,578

(22) Filed: Jan. 20, 2015

Related U.S. Application Data

(60) Provisional application No. 62/047,740, filed on Sep. 9, 2014, provisional application No. 62/047,719, filed on Sep. 9, 2014.

(51) Int. Cl.
*B60K 6/12* (2006.01)
*F16H 37/00* (2006.01)
*F02G 5/02* (2006.01)
*H02P 9/04* (2006.01)
*H02K 7/02* (2006.01)
*H02K 7/18* (2006.01)

(52) U.S. Cl.
CPC ... *B60K 6/12* (2013.01); *F02G 5/02* (2013.01); *F16H 37/00* (2013.01); *H02K 7/025* (2013.01); *H02K 7/18* (2013.01); *H02P 9/04* (2013.01)

(58) Field of Classification Search
None
See application file for complete search history.

(56) References Cited

U.S. PATENT DOCUMENTS

| 4,027,865 | A | 6/1977 | Greenwood et al. | |
|---|---|---|---|---|
| 2011/0198143 | A1* | 8/2011 | Gravino | 180/165 |
| 2012/0216638 | A1* | 8/2012 | Pritchard et al. | 74/329 |
| 2012/0223533 | A1* | 9/2012 | Iwanowski | 290/40 R |
| 2013/0192399 | A1* | 8/2013 | Cross | 74/405 |

* cited by examiner

*Primary Examiner* — J. Allen Shriver, II
*Assistant Examiner* — Hilary L Johns
(74) *Attorney, Agent, or Firm* — BrooksGroup

(57) ABSTRACT

The disclosure relates to a product for storing and using energy delivered through a vehicle's drive wheel. A rotatable element may rotate with the drive wheel. A first rotating mechanism may provide an input energy when rotated by the rotatable element. A storage device may receive and store the input energy. A second rotating mechanism may rotate in reaction to selective delivery of the input energy from the storage device to the second rotating mechanism, and may drive the rotatable element. The rotatable element may be adapted to rotate in a first rotational direction to rotate the first rotating mechanism, and may rotate in the same direction when rotated by the second rotating mechanism. A heat transfer device may surround at least part of the storage device. The exhaust system may be routed through the heat exchange device to heat the storage device and increase stored energy.

30 Claims, 12 Drawing Sheets

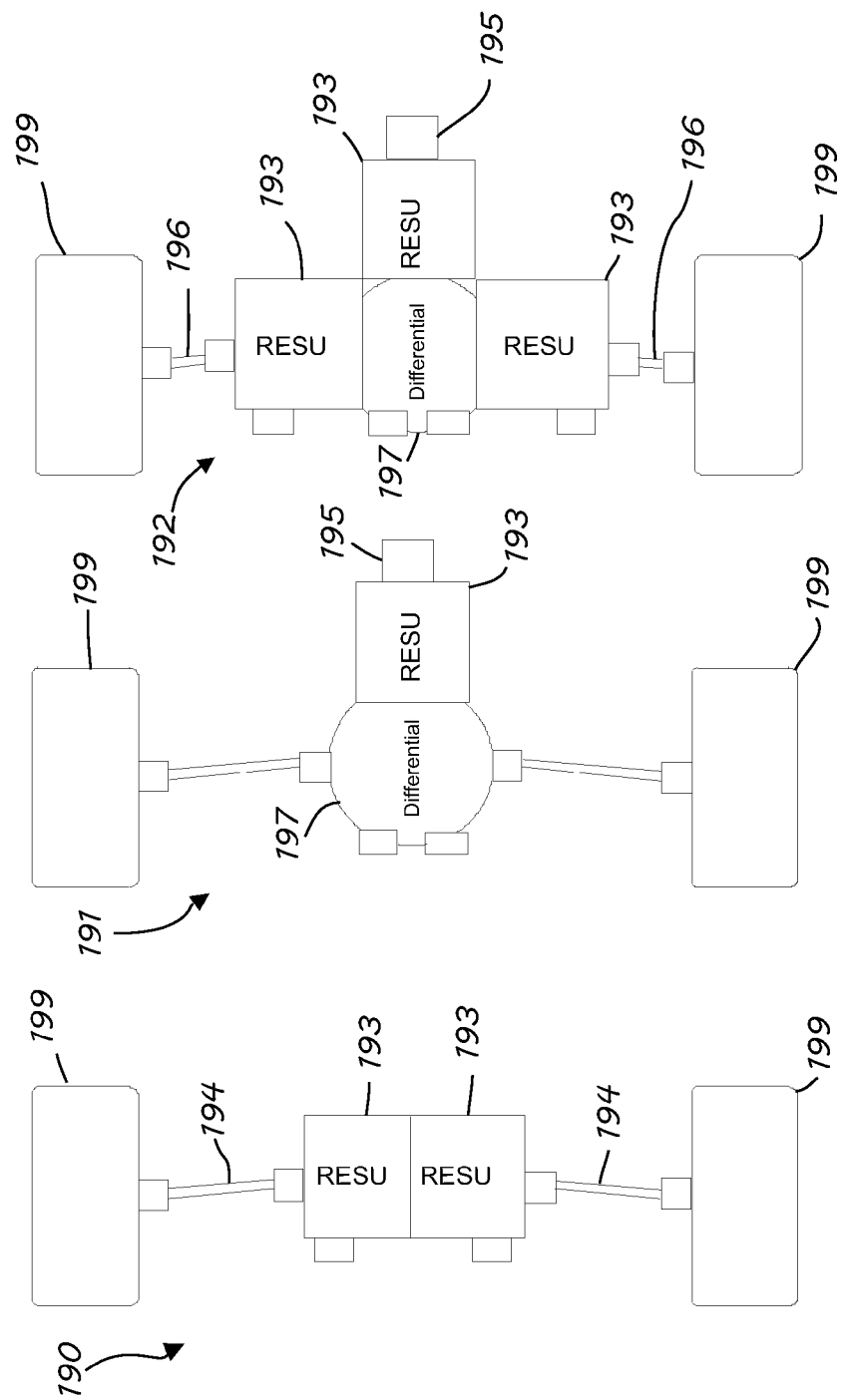

REGENERATIVE ENERGY SYSTEM

CROSS-REFERENCE TO RELATED APPLICATIONS

This application claims the benefit of both U.S. Provisional Application No. 62/047,719, filed Sep. 9, 2014, and U.S. Provisional Application No. 62/047,740, filed Sep. 9, 2014.

TECHNICAL FIELD

The field to which the disclosure generally relates includes regenerative energy systems.

BACKGROUND

Normal operation of a vehicle involves repeated cycles of acceleration and deceleration. Energy used to bring a vehicle up to travelling speed may be substantially greater than that required to maintain a constant speed. Braking to slow a vehicle often means that additional energy must be consumed to resume a faster speed. It may be beneficial to recover vehicle braking energy in order to redeploy the energy when needed, such as during launch or acceleration of the vehicle.

SUMMARY OF ILLUSTRATIVE VARIATIONS

A number of variations may include a product for storing and using energy that may be selectively delivered through a drive wheel of a vehicle. A rotatable element may be connected to the drive wheel to rotate therewith. A first rotating mechanism may deliver input energy when rotated by the rotatable element. A storage device may receive and store the input energy. A second rotating mechanism may rotate in reaction to selective delivery of the input energy from the storage device to the second rotating mechanism. The second rotating mechanism may selectively rotate the rotatable element to turn the drive wheel. The rotatable element may be adapted to rotate in a first rotational direction to rotate the first rotating mechanism. The rotatable element may be adapted to rotate in the first rotational direction when rotated by the second rotating mechanism. A heat exchange device may surround at least a part of the storage device, wherein the vehicle's exhaust system may be routed through the heat exchange device to heat the storage device and increase stored energy.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 9*a* is a schematic illustration of the positioning of a regenerative energy storage in an axle application according to a number of variations.

FIG. 9*b* is a schematic illustration of the positioning of a regenerative energy storage in an axle application according to a number of variations.

FIG. 9*c* is a schematic illustration of the positioning of a regenerative energy storage in an axle application according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
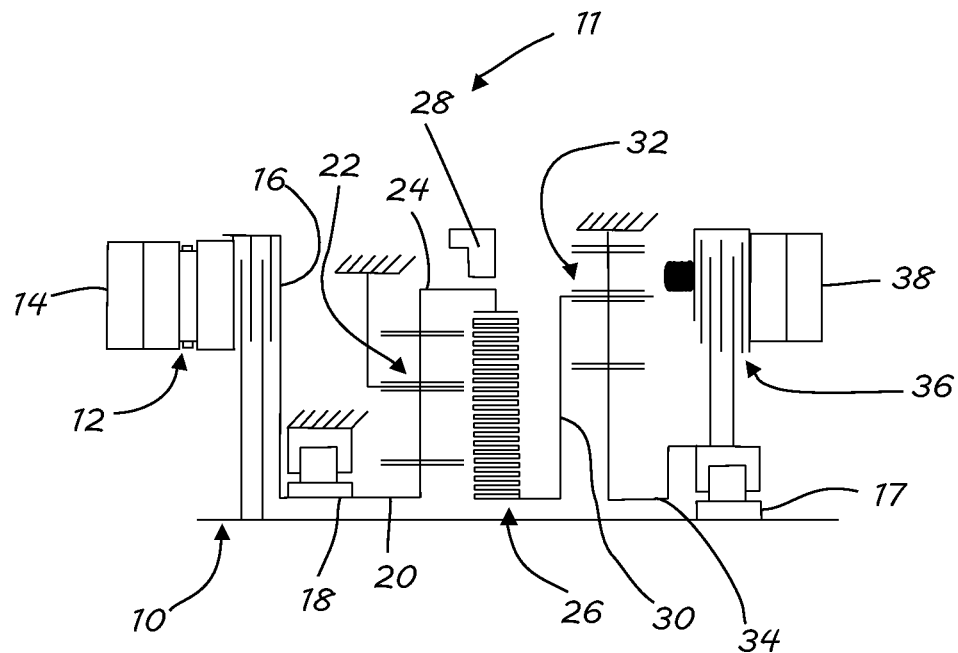
FIG. 1 is a schematic illustration of a regenerative energy storage unit according to a number of variations.

Referring to FIG. 1, a number of variations may include a product in the form of a regenerative energy storage unit 11 with a shaft 10 that may serve as a common input and output shaft. The shaft 10 may be connected to the axle of a vehicle or may also serve as the axle. The shaft 10 may provide input to a windup clutch 12, which may be a normally open clutch that allows the shaft 10 to freely rotate without adding drag when the windup clutch 12 is open. The windup clutch 12 may include an actuator 14 that may selectively be used to close the clutch 12 so that when the shaft 10 rotates, the torque transfer element 15 also rotates. The shaft 10 may also engage a one-way clutch element 16 which may be adapted to freewheel when driven by the shaft 10 without transferring torque.

When rotating, the torque transfer element 15 may drive a one way clutch 18 which may be adapted to supply torque from the torque transfer element 15 to a torque transfer element 20, whenever the element 15 rotates. The one-way clutch element 18 may also be adapted to prevent a reverse rotation of the torque transfer element 20 such that the element 20 may be prevented from driving the torque transfer element 15 in reverse.

The torque transfer element 20 may provide input to a gear set 22 which may be a planetary gear set. The function of the gear set 22 may include reversing the direction of rotation between the torque transfer element 20 and a torque transfer element 24. For example, this can be accomplished by holding the planet carrier, providing input through the sun gear, and providing output through the ring gear. In addition to reversing rotation, the rotational speed will be reduced and torque will be increased. These qualities of the planetary gear set are particularly useful in transferring rotation from the torque transfer element 20 to the torque transfer element 24 since element 24 is used to wind a torsional storage device 26.

The torsional storage device 26 may be a mechanical means of storing torsional energy which may employ a power spring, filament winding, elastomer, or other material with a high energy density and durability to store energy in strain. The torsional storage device 26 may be wound by the torque transfer element 24 and may be monitored by a sensor 28, which may be a rotational sensor that discerns the state of stored energy in torsional storage device 26, by sensing the amount that the device has been wound.

When winding is interrupted by opening of the windup clutch 12, the one-way clutch 18 prevents the reverse rotation of the torque transfer element 24, maintaining the state to which the torsional storage device 26 has been charged. When the sensor 28 senses that the torsional storage device 26 has been wound to its maximum capacity, it is fully-charged and the windup clutch 12 is opened.

Output from the torsional storage device 26 may be communicated to the torque transfer element 30 and there through to a gear set 32, which may be a planetary gear set with the ring gear held. Input may be provided through the planet carrier, and output may be provided through the sun gear. This arrangement results in a rotational speed increase and maintains the same rotational direction between the torque transfer element 30 and the torque transfer element 34, on the output side of the gear set 32. Since the gear set 32 may be used to provide output torque from the torsional storage device 26, the selection is particularly useful as the rotation of the torque transfer element 34 may be used to assist in propelling a vehicle.

The torque transfer element 34 may provide input to a normally closed one-way output clutch 36. With the output clutch 36 being normally closed, energy stored in the torsional storage device 26 is captured. This occurs since rotation in one direction is prevented by the one-way clutch 18, and rotation in the other direction is prevented when the output clutch 36 is closed. The one-way clutch element 17 may allow the torque transfer element 34 to provide torque to the shaft 10, and may prevent the shaft 10 from providing torque to the torque transfer element 34. The one-way clutch element 17 may be provided as an integral part of output clutch 36, or as a separate unit.

When output from the torsional storage device 26 is desired, such as for assistance in propelling a vehicle, the actuator 38 may be energized to open the normally closed output clutch 36 and the torque transfer element 34 may then supply torque to the shaft 10. The direction of rotation of the shaft 10 is in the same rotational direction as when the shaft 10 provides input to wind the torsional storage device 26 (even though the input and output are through a loop), since the gear set 22 has reversed the direction of rotation during winding.

Figure 2:
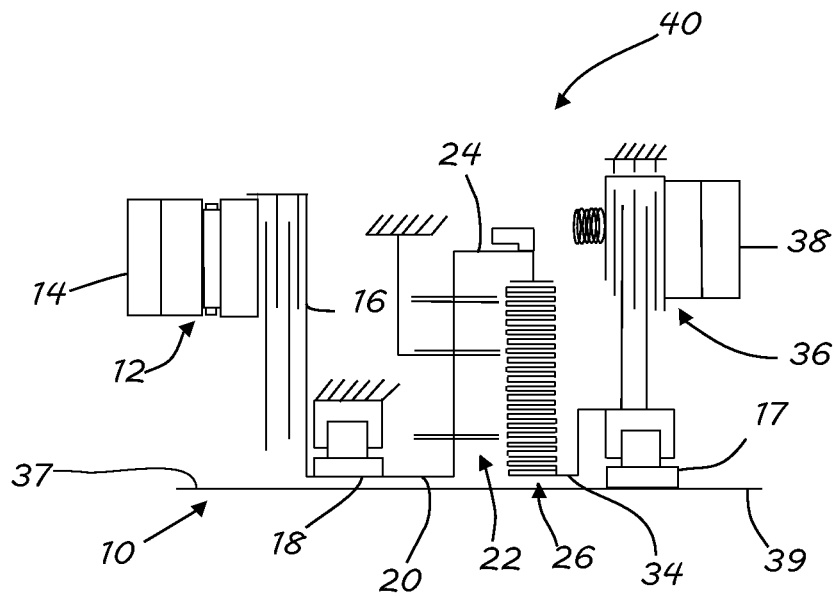
FIG. 2 is a schematic illustration of a regenerative energy storage unit according to a number of variations.

Referring to FIG. 2, a regenerative energy storage unit 40 according to a number of variations is illustrated. Like elements are designated with the same reference numeral as used in FIG. 1. In the regenerative energy storage unit 40, torque transfer element 34 may deliver torque directly from the torsional storage device 26 to a normally closed one-way output clutch arrangement 36 and 17. The torque may be taken from the shaft 10 at the end 37 and/or the end 39 depending on the application's needs.

Figure 3:
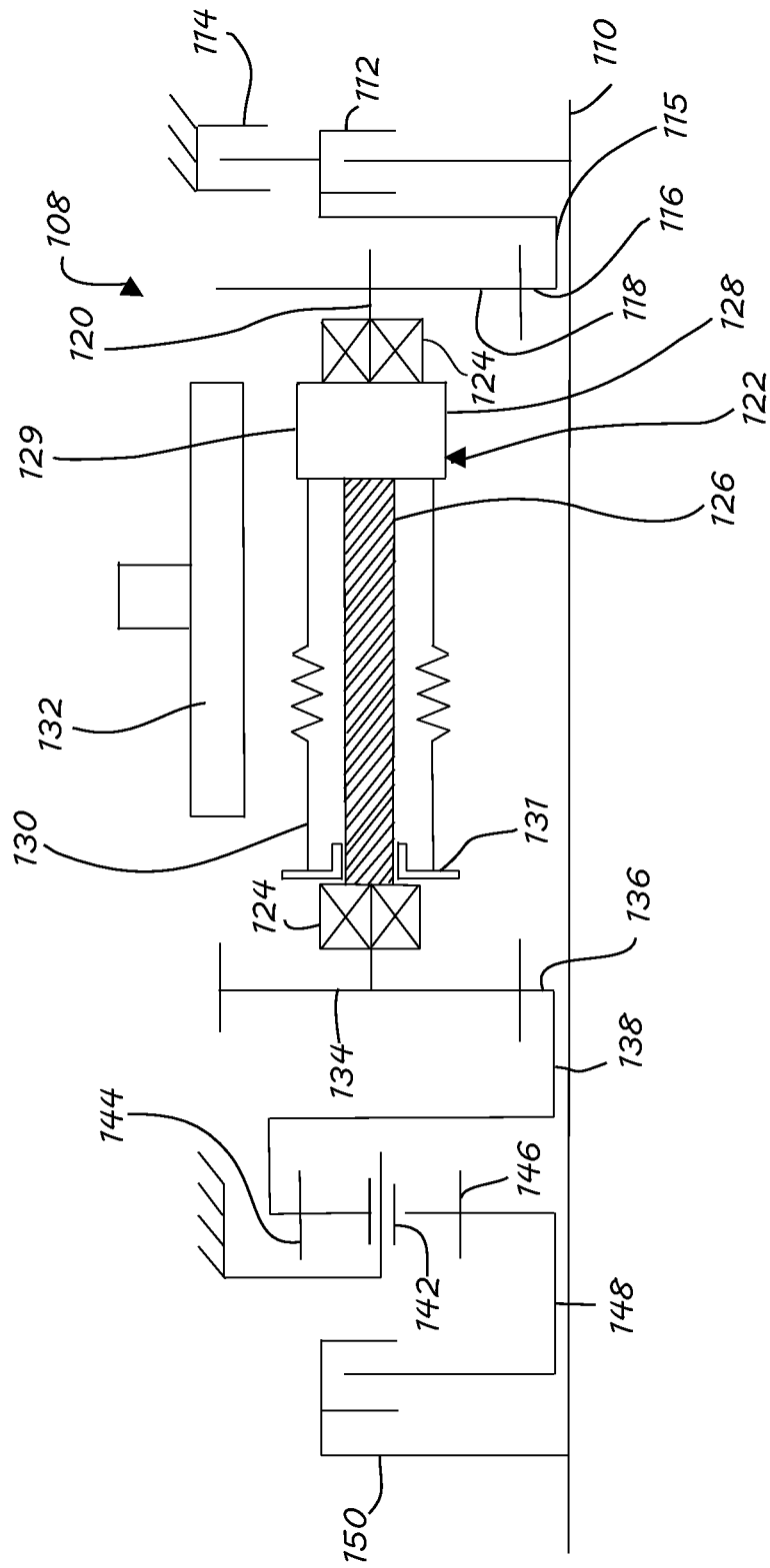
FIG. 3 is a schematic illustration of a regenerative energy storage unit according to a number of variations.

Referring to FIG. 3, a number of variations may include a product in the form of a regenerative energy storage unit 108 with a shaft 110 that may serve as a common input and output shaft. The shaft 110 may be connected to the axle of a vehicle or may also serve as the axle. The shaft 110 may provide input to a windup clutch 112 that may be a normally open clutch that allows the shaft 110 to freely rotate without adding drag when the windup clutch 112 is open. The windup clutch 112 may include an actuator that may be selectively used to close the clutch 112 so that when the shaft 110 rotates, a torque transfer element rotates that may be a shaft 115. When the windup clutch 112 is open, the shaft 110 may freely rotate. To hold the shaft 115 from rotating, a holding clutch 114 may be provided that can be selectively closed when the windup clutch 112 is open.

When rotating, the shaft 115 may drive a gear 116 which may be adapted to engage a gear 118. The gear 118 may be engaged on a torque transfer element which may be a shaft 120. The shaft 120 may rotate whenever the shaft 115 rotates. The shaft 120 may be part of the shaft of a ball screw unit 122 and may be supported by the bearings 124. The ball screw unit 122 may include a screw 126 and a ball nut assembly 128, which may include the nut 129 and a number of balls (not shown). The balls may be captured between the grooves in the screw 126 and the nut 129, providing a low friction rolling interface.

The ball screw unit 122 may be a mechanical means of storing compressed energy through employment of a compression element or elements 130. The compression element 130 may be a mechanical or pneumatic element that stores energy when compressed. The stored energy may be released when the compression element 130 is allowed to expand. The compression element 130 may be compressed when the shaft 120 rotates, which causes the nut 129 to translate along the screw 126 reducing the distance between the nut 129 and a stop 131.

The amount of compression may be monitored by a sensor 132, which may be a position sensor that monitors the state of stored energy in the ball screw unit 122 by sensing the amount that the nut 129 has moved toward the stop 131. When winding is interrupted by opening of the windup clutch 112, the holding clutch 114 may prevent the reverse rotation of the shaft 120 maintaining the state to which the ball screw unit 122 has been charged. When the sensor 132 senses that the compression element 130 has been compressed to its maximum capacity it is fully-charged and the windup clutch 112 is opened and the holding clutch 114 is closed.

Output from the ball screw unit 122 may be communicated through the shaft 120 and a gear 134, which may be adapted to engage a gear 136 on the shaft 138. The shaft 120 may serve as both the input element and the output element of the ball screw unit 122. The output path through the shaft 138 may also extend through a gear set, which may be a planetary gear set with the planet carrier 142 held.

Input may be received from the shaft 138 through the ring gear 144, and output may be provided through the sun gear 146. These connection selections result in rotational speed increase through the gear set and provide for reversed rotational direction between the shaft 138 and the shaft 148 on the output side of the gear set. Since the gear set 142, 144, 146 is used to provide output torque from the ball screw unit 122, the selection is particularly useful as the rotation of shaft 148 may be used to assist in propelling a vehicle.

When compression element is allowed to expand, the ball nut assembly is driven away from the stop 131, which rotates the screw 126 in the reverse of the direction it rotates during compression. Providing a reversal of rotational direction through the gear set 142, 144, 146 means that the shaft 148 will rotate in the same rotational direction as the shaft 115 rotates during charging of the ball screw unit 122. This is advantageous since the shaft 148 provides input to a normally open output clutch 150, which when closed may deliver torque from the shaft 148 to the shaft 110.

When output from the ball drive unit 122 is desired, such as for assistance in propelling a vehicle through the shaft 110, the output clutch 150 may be controllably closed and the holding clutch 114 may be opened at a rate that enables the smooth release of torque from the ball screw unit 122. The normally open windup clutch 112 may remain open. This allows the shaft 148 to supply torque to the shaft 110. The rotation of the shaft 110 is in the same rotational direction as when the shaft 110 provides input to compress the compression element 130, even though the input and output are through a loop, since the gear set 142, 144, 146 has reversed the direction rotation from the ball nut 126. Input and output can be from either end of the shaft 110.

Figure 4:
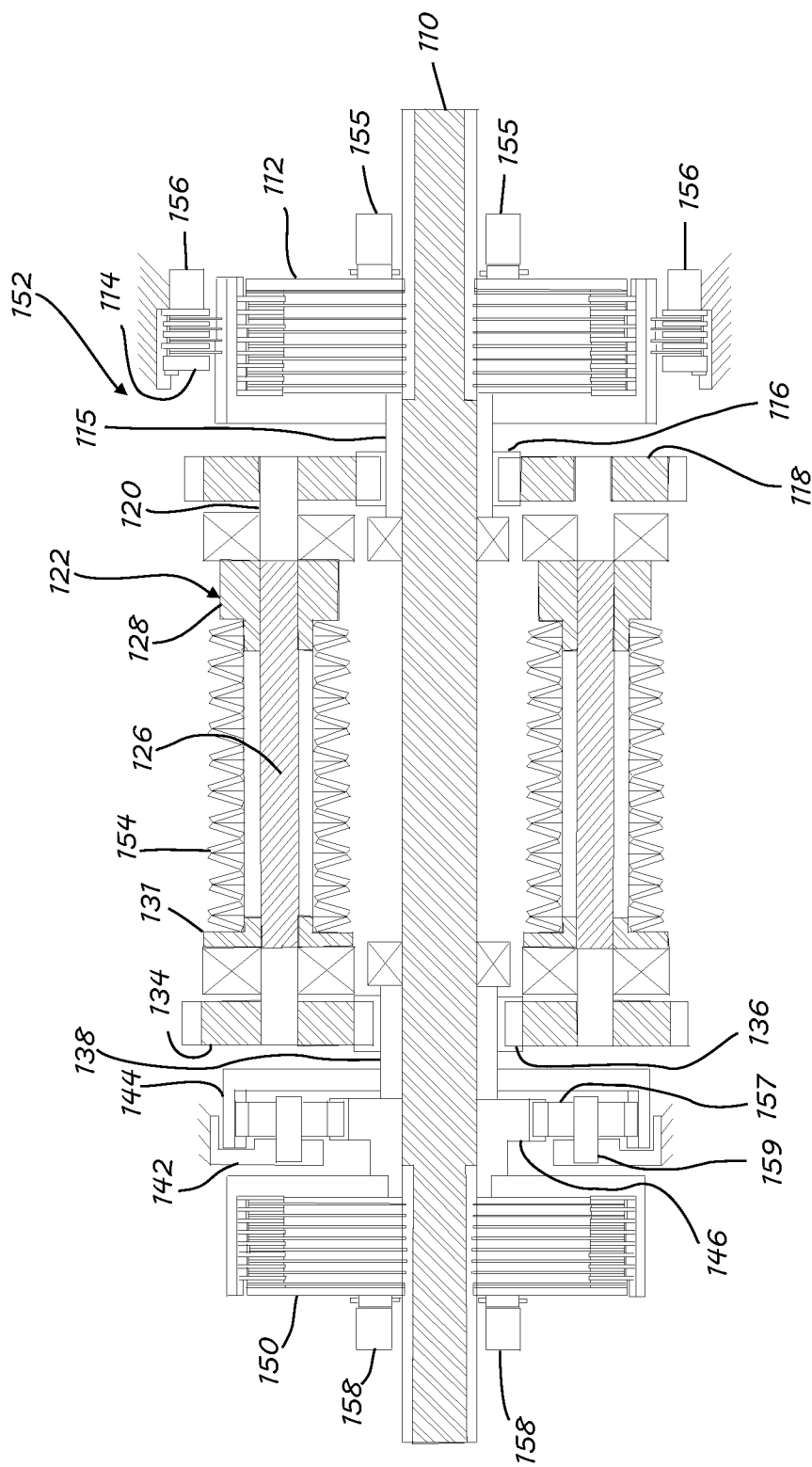
FIG. 4 is a schematic illustration of a regenerative energy storage unit according to a number of variations.

Referring to FIG. 4, a regenerative energy storage unit 152 according to a number of variations is illustrated. Like elements are designated with the same reference numerals used in FIG. 3. In regenerative energy storage unit 152, shaft 110 delivers torque to, and receives torque from multiple ball screw units 122. As shown, two ball screw units are illustrated on opposite sides of shaft 110, however, additional units may be disposed around shaft the 110 in a circular or other pattern to provide additional energy storage.

Input from the shaft 110 may be provided when a vehicle decelerates such as during braking when rotational energy is available. The input travels through the windup clutch 112, the shaft 115, the gear 116, the gear 118 and the shaft 120. The windup clutch 112 and the holding clutch 114 may include actuators 155, 156 respectively for selective control of the clutches.

The shaft 120 may include a screw 126 which, when rotated causes the ball nut assembly 128 to translate toward the stop 131. This compresses the compression element which may be in the form of a compression spring such as multiple Belleville discs 154 stacked in alternating directions to allow for greater deflection. When the Belleville discs 154 are compressed, they provide a mechanical means of storing rotational energy. When the compression element is fully compressed, the windup clutch 112 may be opened and the holding clutch 114 may be closed to prevent expansion of the Belleville discs 154.

Output from the ball screw unit 122 to the shaft 110 travels in-order, through the shaft 120, the gear 134, the gear 136, the shaft 138, the ring gear 144, the planet gears 157, the sun gear 146, and the output clutch 150. The output clutch 150 may include actuators 158 to selectively close the clutch and to allow the transfer of torque from the ball screw unit 122 to the shaft 110. When driving of the shaft 110 from the ball screw unit 122 is desired, the actuators 156 on the holding clutch 114 are activated to open the clutch and allow rotation of the shaft 115, the gear 116, the gear 118 and thereby the shaft 120.

The actuators 158 may also be activated to close the output clutch 150 so that as the Belleville discs expand driving the ball nut assembly 128 away from the stop 131, the shaft 120 rotates causing the gear 134, the gear 136, the shaft 138 and the ring gear 144 to rotate. A planet carrier 142 is held from rotation and so the rotation of the ring gear 144 causes the planet gears 157 to rotate about their center shafts 159 in the same rotational direction as the ring gear 144. This causes the sun gear 146 to rotate in an opposite rotational direction from the ring gear 144. Rotation of the sun gear 146 causes the clutch plates in the output clutch 150 to rotate, along with the shaft 110, providing torque thereto from the ball screw unit 122. Energy may be released from only one ball screw unit 122 or from multiple units simultaneously when additional torque is desired.

Figure 5:
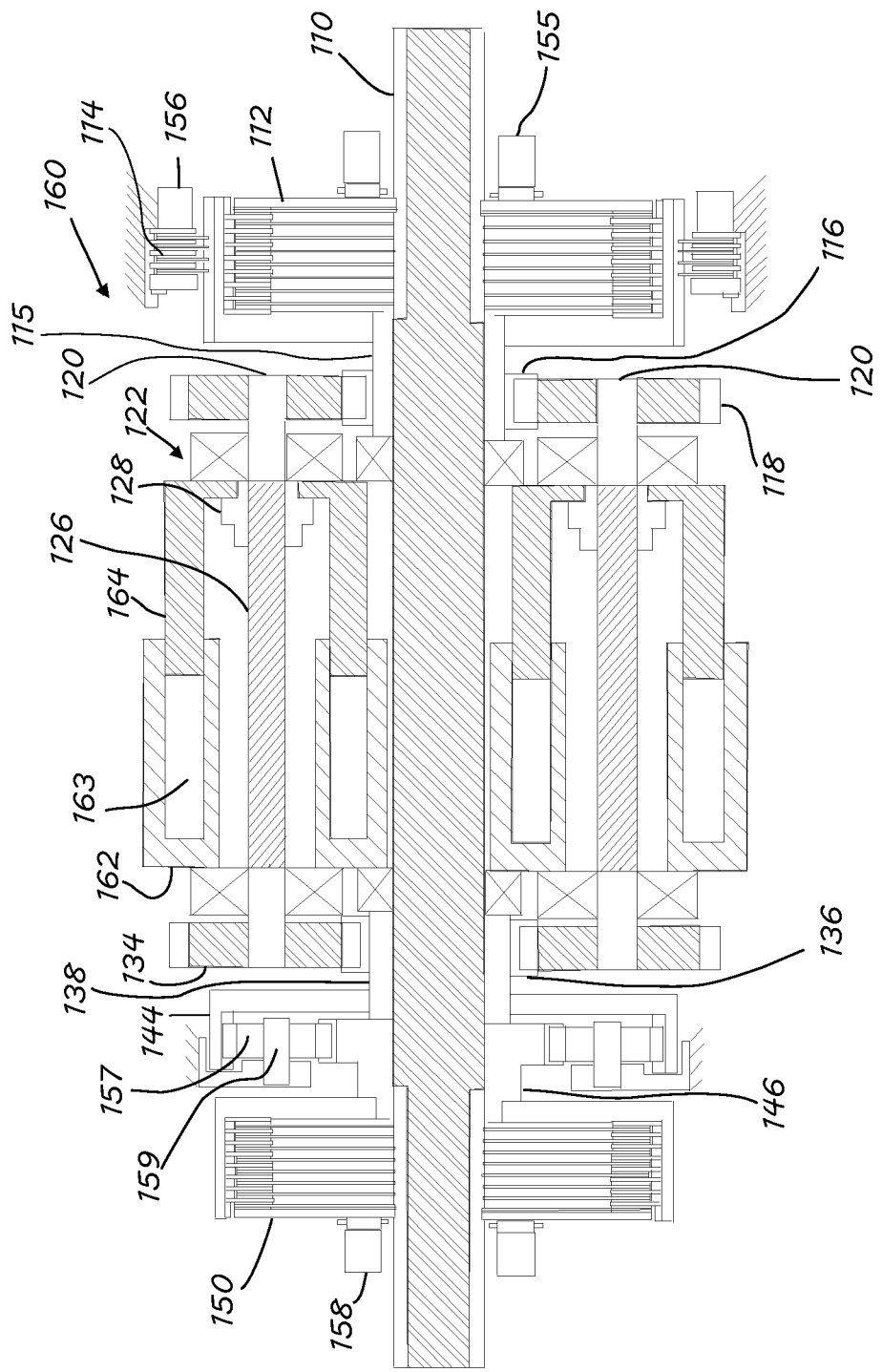
FIG. 5 is a schematic illustration of a regenerative energy storage unit according to a number of variations.

Referring to FIG. 5, a regenerative energy storage unit 160 according to a number of variations is illustrated. Like elements are designated with the same reference numerals used in FIGS. 3 and 4. In regenerative energy storage unit 160, a shaft 110 delivers torque to, and receives torque from multiple ball screw units 122. As shown, two ball screw units are illustrated on opposite sides of the shaft 110, however, additional units may be disposed around the shaft 110 in a circular pattern to provide additional energy storage.

Input from the shaft 110 may be provided when a vehicle decelerates such as during braking when rotational energy is available. The input travels through the windup clutch 112, the shaft 115, the gear 116, the gear 118 and the shafts 120. The windup clutch 112 and the holding clutch 114 may include actuators 155, 156 respectively, for selective control of the clutches.

The shaft 120 may include a screw 126 which, when rotated causes a ball nut assembly 128 to translate toward a cylinder jacket 162. This compresses the compression element which may be in the form of a gas captured in the chamber 163 between the piston 164 and the cylinder jacket 162. When the chamber 163 is compressed, the gas provides a pneumatic means of storing rotational energy. When fully compressed, the windup clutch 112 is opened and the holding clutch 114 is closed to prevent expansion of the chamber 163. The chamber 163 may be pre-charged to a preferred pressure so as to ensure usable torque is provided to the point where the chamber 163 is fully expanded.

Output from the ball screw unit 122 to the shaft 110 travels through the shaft 120, the gear 134, the gear 136, the shaft 138, the ring gear 144, the planet gears 157, the sun gear 146, and the output clutch 150. The output clutch 150 may include actuators 158 to selectively close the clutch and allow the transfer of torque from the ball screw unit 122 to the shaft 110. When driving of the shaft 110 from the ball screw unit 122 is desired, the actuators 156 on the holding clutch 114 are activated to open the clutch and allow rotation of the shaft 115, the gear 116, the gear 118 and thereby the shaft 120.

The actuators 158 may also be activated to close the output clutch 150 so that as the chamber 163 expands driving ball nut assembly 128 away from the cylinder jacket 162, the shaft 120 rotates causing the gear 134, the gear 136, the shaft 138 and the ring gear 144 to rotate. The planet carrier 142 is held from rotation and so the rotation of the ring gear 144 causes the planet gears 157 to rotate about their center shafts 159 in the same rotational direction as the ring gear 144. This causes the sun gear 146 to rotate in an opposite rotational direction from the ring gear 144. Rotation of the sun gear 146 causes the clutch plates in the output clutch 150 to rotate and the shaft 110, providing torque thereto from the ball screw unit 122. Energy may be released from only one ball screw unit 122 or from multiple units simultaneously when additional torque is desired.

Figure 6:
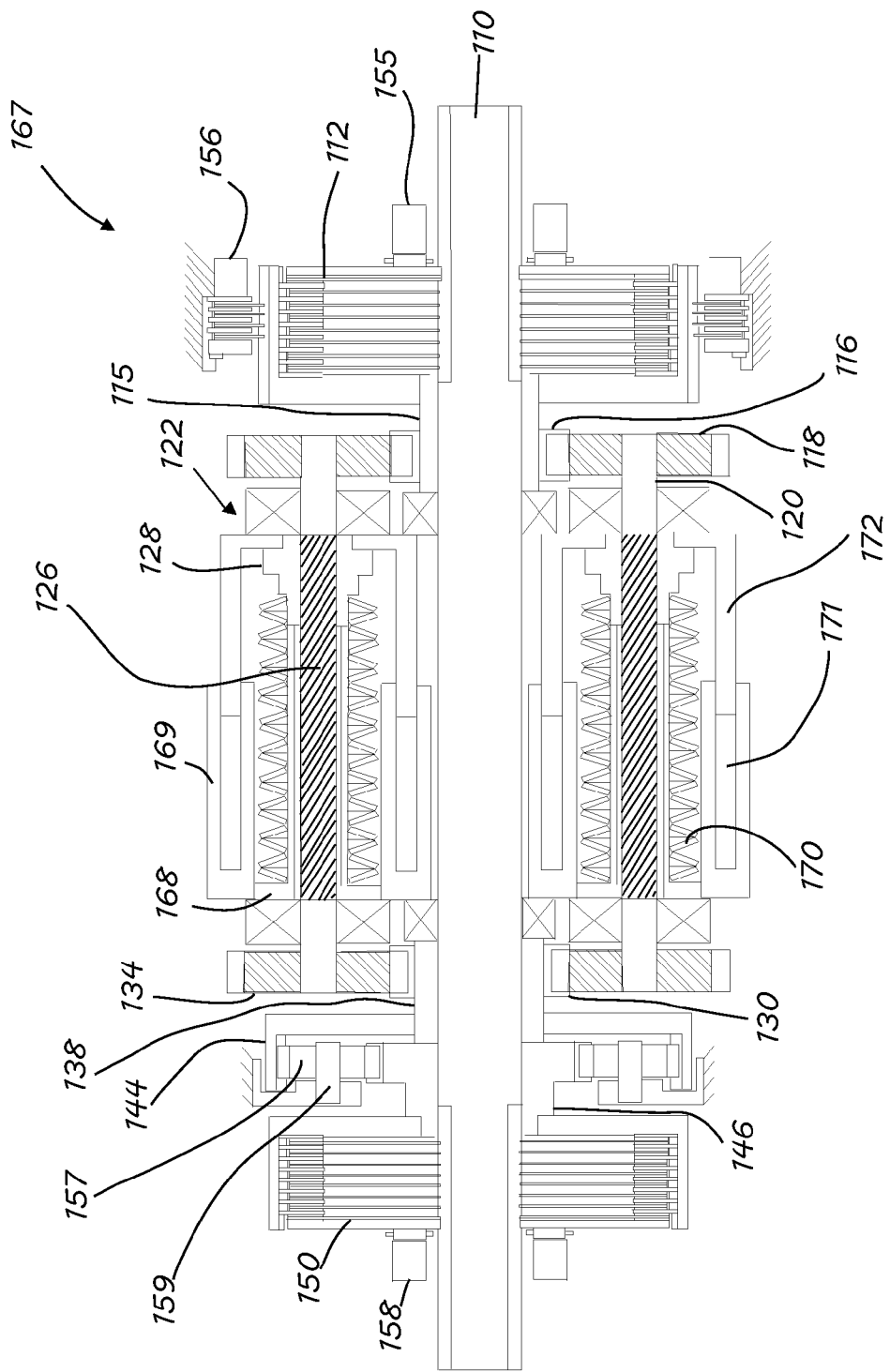
FIG. 6 is a schematic illustration of a regenerative energy storage unit according to a number of variations.

Referring to FIG. 6, a regenerative energy storage unit 167 according to a number of variations is illustrated. Like elements are designated with the same reference numeral as used in FIGS. 3-5. In the regenerative energy storage unit 167, the shaft 110 delivers torque to, and receives torque from the ball screw unit 122. As shown, two ball screw units are illustrated on opposite sides of shaft 110, however, additional units may be disposed around shaft 110 in a circular or other pattern to provide additional energy storage.

Input from the shaft 110 may be provided when a vehicle decelerates such as during braking when rotational energy is available. The input travels through the windup clutch 112, the shaft 115, the gear 116, the gear 118 and the shafts 120. The windup clutch 112 and the holding clutch 114 may include actuators 155, 156 respectively, for selective control of the clutches.

The shaft 120 may include a screw 126 which, when rotated causes a ball nut assembly 128 to translate toward a stop 168 and a cylinder jacket 169. This compresses the compression element which may be in the form of both Belleville springs 170 and a gas captured in the chamber 171 between the piston 172 and the cylinder jacket 169. When the Belleville springs 170 and the chamber 171 are compressed, the springs provide a mechanical means of storing rotational energy and the gas in the chamber 171 provides a pneumatic means of storing rotational energy. When the compression elements are fully compressed, the windup clutch 112 may be opened and the holding clutch 114 may be closed to prevent expansion of the Bellville springs 170 and the chamber 171.

Output from the ball screw unit 122 to the shaft 110 travels through the shaft 120, the gear 134, the gear 130, the shaft 138, the ring gear 144, the planet gears 157, the sun gear 146, and the output clutch 150. The output clutch 150 may include actuators 158 to selectively close the clutch and allow the transfer of torque from the ball screw unit 122 to the shaft 110. When driving of the shaft 110 from the ball screw unit 122 is desired, the actuators 156 on the holding clutch 114 are activated to open the clutch and allow rotation of the shaft 115, the gear 116, the gear 118 and thereby the shaft 120.

The actuators 158 may also be activated to close the output clutch 150 so that as the chamber 163 expands driving the ball nut assembly 128 away from the cylinder jacket 162, the shaft 120 rotates causing the gear 134, the gear 130, the shaft 138 and the ring gear 144 to rotate. The planet carrier 142 is held from rotation and so the rotation of the ring gear 144 causes the planet gears 157 to rotate about their center shafts 159 in the same rotational direction as ring gear 144. This causes the sun gear 146 to rotate in an opposite rotational direction from the ring gear 144. Rotation of the sun gear 146 causes the clutch plates in the output clutch 150 to rotate the shaft 110, providing torque thereto from ball screw unit 122. Energy may be released from only one ball screw unit 122 or from multiple units simultaneously when additional torque is desired.

Figure 7:
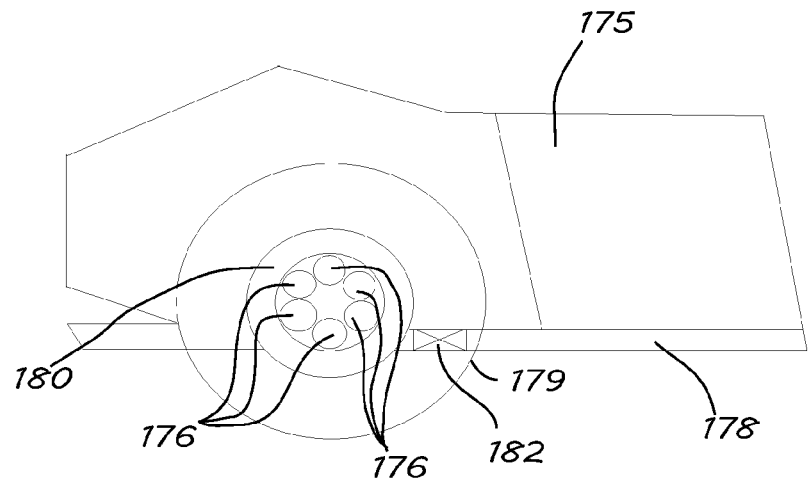
FIG. 7 is schematic illustration of the positioning of a regenerative energy storage in an axle application according to a number of variations.

FIG. 7 shows a regenerative energy storage unit according to a number of variations. Six regenerative energy storage units 176 may be provided around a common shaft such as that of an axle of vehicle 175 driving wheel 179. The six regenerative energy storage units 176 may be any of the types described in reference to FIGS. 1 through 6, and may be arranged in a circular pattern around the shaft.

For the regenerative energy storage units 176, the amount of energy stored may be enhanced by routing an exhaust line 178 into a chamber 180 around the regenerative energy storage units 176. The valve 182 may be used to modulate the amount of exhaust supplied to the chamber 180. Heating by using the exhaust of vehicle 175 elevates the temperature and, in the case of compressed gas, may result in increased pressure inside the chambers of the regenerative energy storage units 176. Heating the regenerative energy storage units 176 with exhaust gas effectively increases the amount of energy that can be stored, and available for use.

Figures 8A, 8B, 8C:
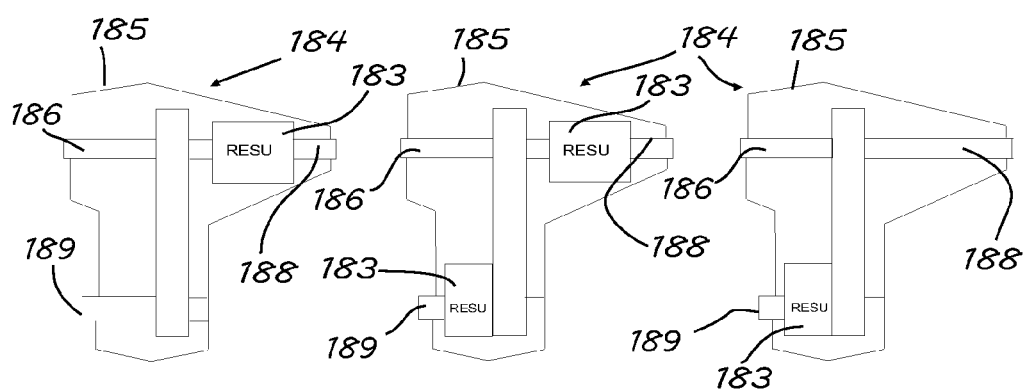
FIG. 8*a* is a schematic illustration of the positioning of a regenerative energy storage in a transfer case unit application according to a number of variations.
FIG. 8*b* is a schematic illustration of the positioning of a regenerative energy storage in a transfer case unit application according to a number of variations.
FIG. 8*c* is a schematic illustration of the positioning of a regenerative energy storage in a transfer case unit application according to a number of variations.

The regenerative energy storage units 11, 40, 108, 152, 160 and 167 may be applied to a transfer case as shown in FIGS. 8a, 8b and 8c. Applying the regenerative energy storage units 11, 40, 108, 152, 160 and 167 to one or both output shafts of the transfer case is useful to provide additional torque when needed by the front and rear drive of a four wheel drive vehicle.

Referring to FIGS. 8a through 8c a regenerative energy storage unit according to a number of variations is illustrated. A transfer case 184 for a four wheel drive system may include a case 185 through which an input shaft 186 selectively drives a rear output shaft 188 and drives a front output shaft 189. The regenerative energy storage units 183 may be positioned within the case 185 and may be applied to the rear output shaft 188 as shown in FIG. 8a, both output shafts as shown in FIG. 8b, and the front output shaft 189 as shown in FIG. 8c. The regenerative energy storage units 183 may receive input from a rotating element of the transfer case 184 and may provide output to the same or a different rotating element of the transfer case 184.

The regenerative energy storage units 11, 40, 108, 152, 160 and 167 may also be applied to a drive axle as shown in FIGS. 9a, 9b and 9c. The input and output arrangement of the regenerative energy storage units may be applied: to receive input from the drive shaft 195 and provide output to the differential 197; to receive input from the differential 197 and provide output to the half-shafts 196; or to receive input from, and provide output to the half shafts 194.

Referring to FIGS. 9a through 9c, a regenerative energy storage unit according to a number of variations is illustrated. The axle assemblies 190-192 may include wheels 199. In FIG. 9a the regenerative energy storage units 193 are applied to the half-shafts 194, without a drive shaft input or differential. The regenerative energy storage units receive input from, and provide output to, the half-shafts 194. In FIG. 9b the regenerative energy storage unit 193 is applied to the drive shaft 195. The input and output arrangement of regenerative energy storage unit 193 may be applied to receive input from drive shaft 195 and provide output to differential 197. In FIG. 9c the regenerative energy storage units 193 are applied to both the half-shafts 196 and the drive shaft 195. The regenerative energy storage units may be operated individually or in combination depending on conditions.

Figure 10:
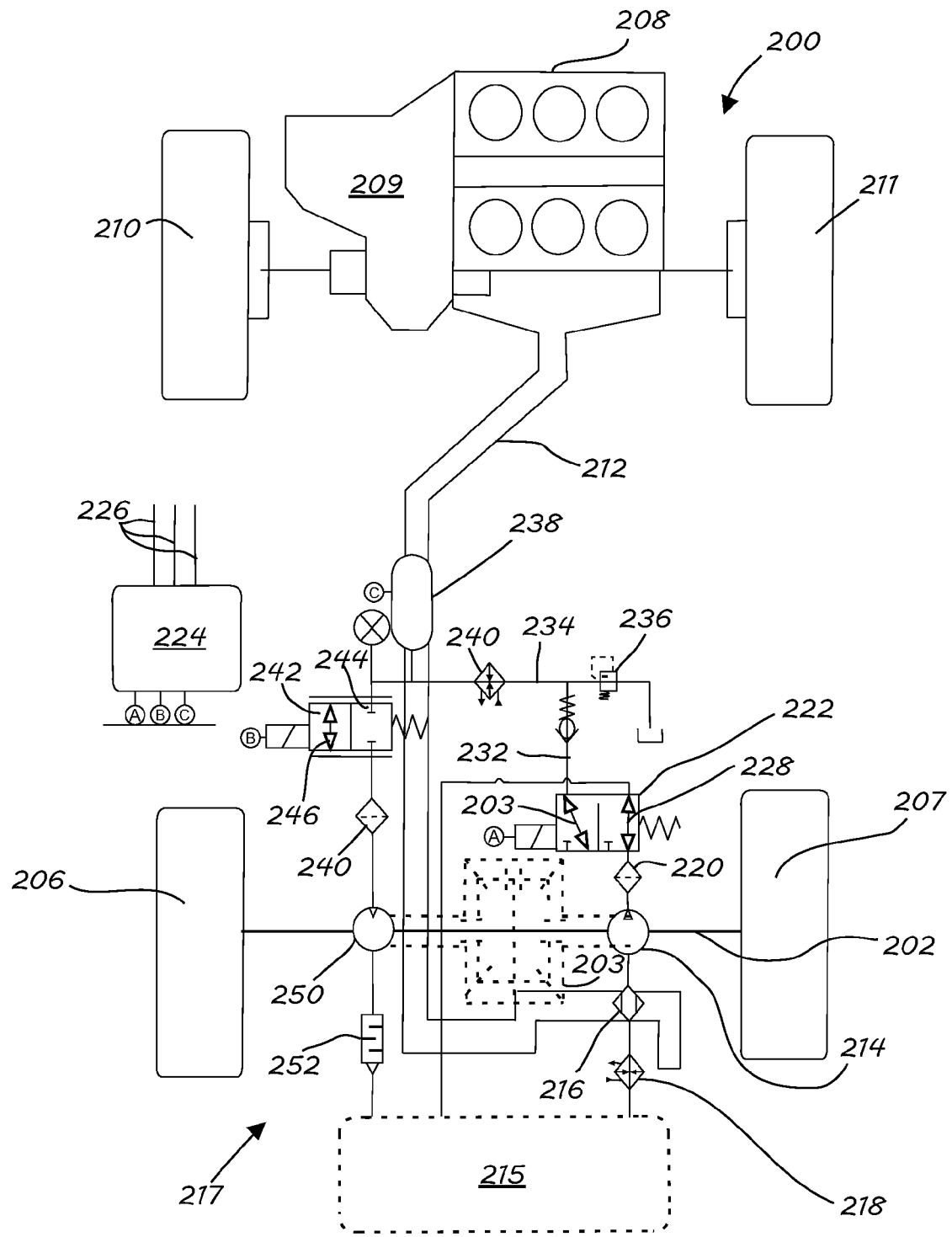
FIG. 10 is a schematic illustration of a regenerative energy system according to a number of variations.

Referring to FIG. 10, a regenerative energy system 200 according to a number of variations may be associated with an axle 202 that may include a differential 203. Wheels 206 and 207 may be connected to the drive axle 202. The vehicle may have an engine 208 with a transaxle 209 for driving the wheels 210, 211. The engine 208 may have an exhaust system 212 for conveying combustion gases from the engine 208 to the rear of the vehicle.

A pressurized fluid circuit 217 may include a compressor 214 which draws air from the atmosphere 215 through a line that may include a dryer 216, 218 that may use exhaust gas temperature in the exhaust system 212 as an energy source for drying action. The compressor may be driven by the axle 202 and may deliver pressurized gas through a filter 220 to a control valve 222. The control valve 222 may include an actuator that is in communication with a controller 224 through a conductor that connects the points A-A. The controller 224 may include conductors 226 for interconnection with a power supply, with a return or ground, and with the vehicle's electronic network through which the controller may receive and send information.

The control valve 222 may direct compressed gas back to atmosphere 215 through the path 228 or may direct compressed gas to the check valve 232 through the path 203. When gas is directed through the path 228 back to atmosphere 215, the compressor may do little to no work. When the control valve 228 may be actuated to direct flow through the path 203, the outlet from the compressor may be throttled to cause the compressor 214 to impart a braking action to the axle 202. The energy resulting from braking may be captured through compression action. Flow directed through the check valve 232 continues to line 234, which may be provided with a pressure relief valve 236.

The line 234 may be connected to an energy storage device in the form of a canister 238. The canister may have a capacity of five liters and may store compressed gas at up to 500 bar. Pressurized gas stored in the canister 238 may be heated by the exhaust system 212. Exhaust gas may be channeled around or through an enclosure around the canister 238 and may be directed through a heater 240 in line 234. Pressurized gas may be maintained in the storage canister 238 between check valve 232 and control valve 242 which is normally closed at 244.

A pressure sensor may be provided in line 234 to monitor the fluid pressure and communicate readings to controller 224 through a conductor connecting the points C-C. The control valve 242 may be in communication with controller 224 through a conductor connecting the points B-B for selective actuation. Actuation of the control valve 242 allows fluid pressure to be transmitted though path 246 and on through a filter 240 to the motor 250, to impart rotation to the axle 202. Exhaust gas may be expelled from the motor 250 through a silencer 252 to the atmosphere 215. The foregoing pressurized fluid circuit 217 is useful in capturing and redeploying braking energy, and engine exhaust gas may be used as a heat source to dry and warm the compressed gas, increasing efficiency.

Figure 11:
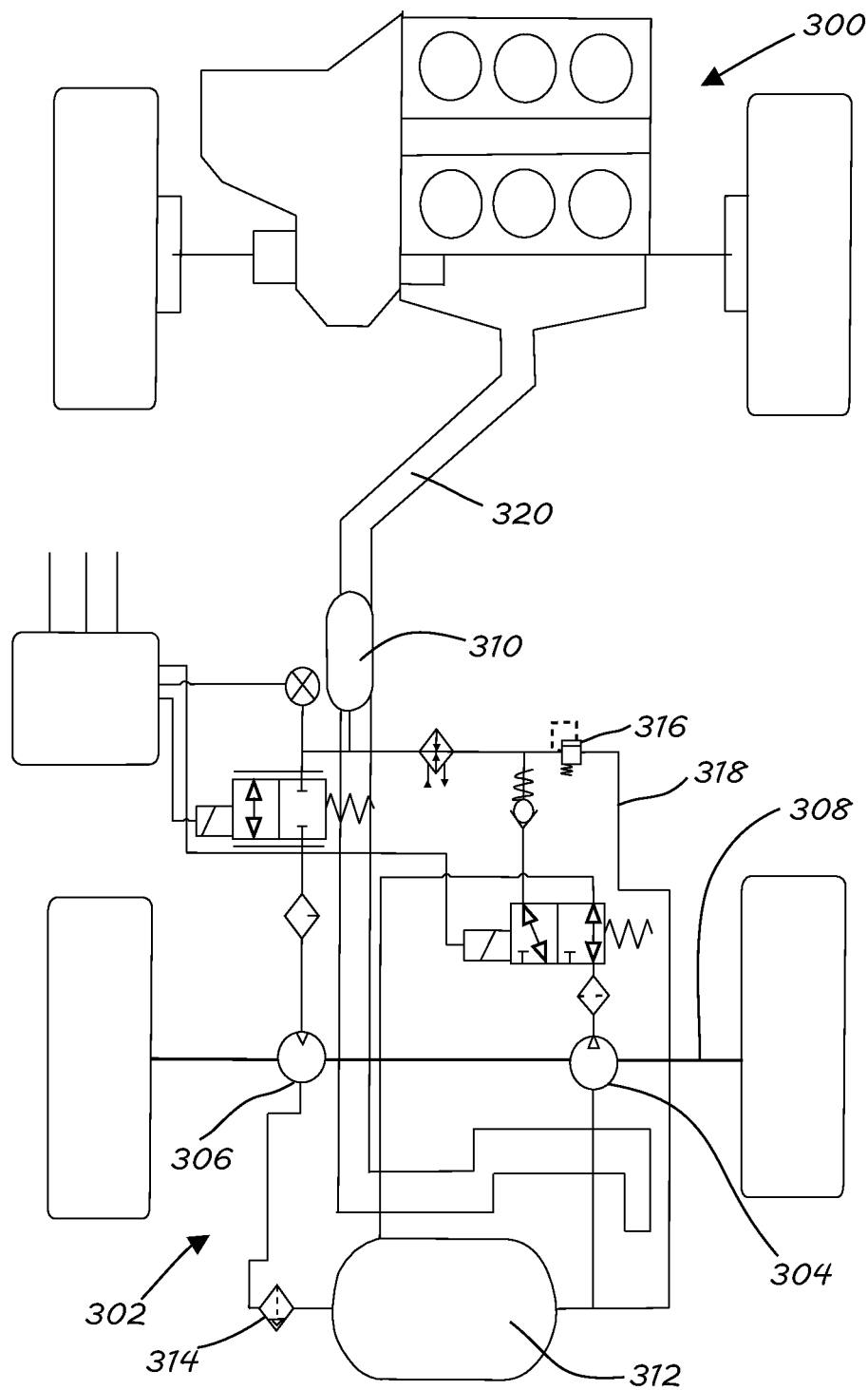
FIG. 11 is a schematic illustration of a regenerative energy system according to a number of variations.

A number of other variations may include a regenerative energy system 300 as illustrated in FIG. 11. The regenerative energy system 300 may include a pressurized fluid circuit 302 that is similar to the pressurized fluid circuit 217 of FIG. 10, but instead of being open to the atmosphere is a closed loop system. The pressurized fluid circuit 302 may circulate compressed gas between a high pressure storage canister 310 and a low pressure storage vessel 312. The compressed gas travels through a compressor 304 and a motor 306, each engaged with an axle 308. The pressurized fluid circuit 302 may operate on a dry gas such as nitrogen and may not require a dryer. A separator 314 may be provided between the motor 306 and the storage vessel 312 to remove contaminates. The gas may be circulated through the pressurized fluid circuit 302 in a manner similar to that of pressurized fluid circuit 217 including with added heat from exhaust system 320.

Figure 12:
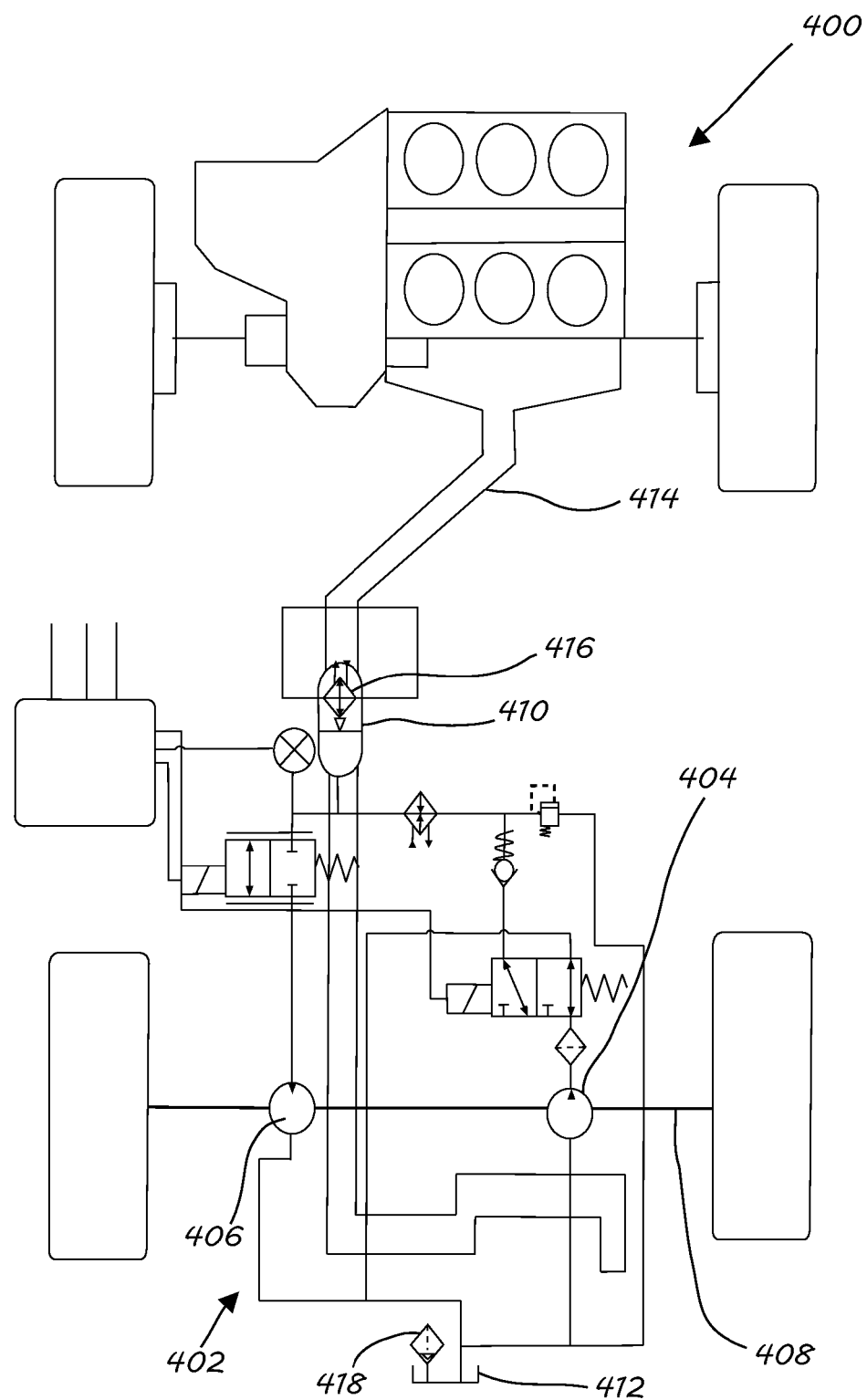
FIG. 12 is a schematic illustration of a regenerative energy system according to a number of variations.

FIG. 12 illustrates a number of variations of a regenerative energy system 400 with a pressurized fluid circuit 402. The pressurized fluid circuit 402 may circulate hydraulic fluid through a pump 404 and a motor 406, each engaged with an axle 408. The circuit 402 is routed between a high pressure storage canister 410 and a hydraulic tank 412. The pressurized fluid circuit 402 may operate with a charge in the high pressure storage canister 410 which may employ a dry gas such as nitrogen provided over the hydraulic fluid. The engine exhaust system 414 may provide heat to the gas charge in the storage canister 410 through a heater 416 or through an enclosure provided around the storage canister 410. The hydraulic tank 412 may include a vent 418.

Figure 13:
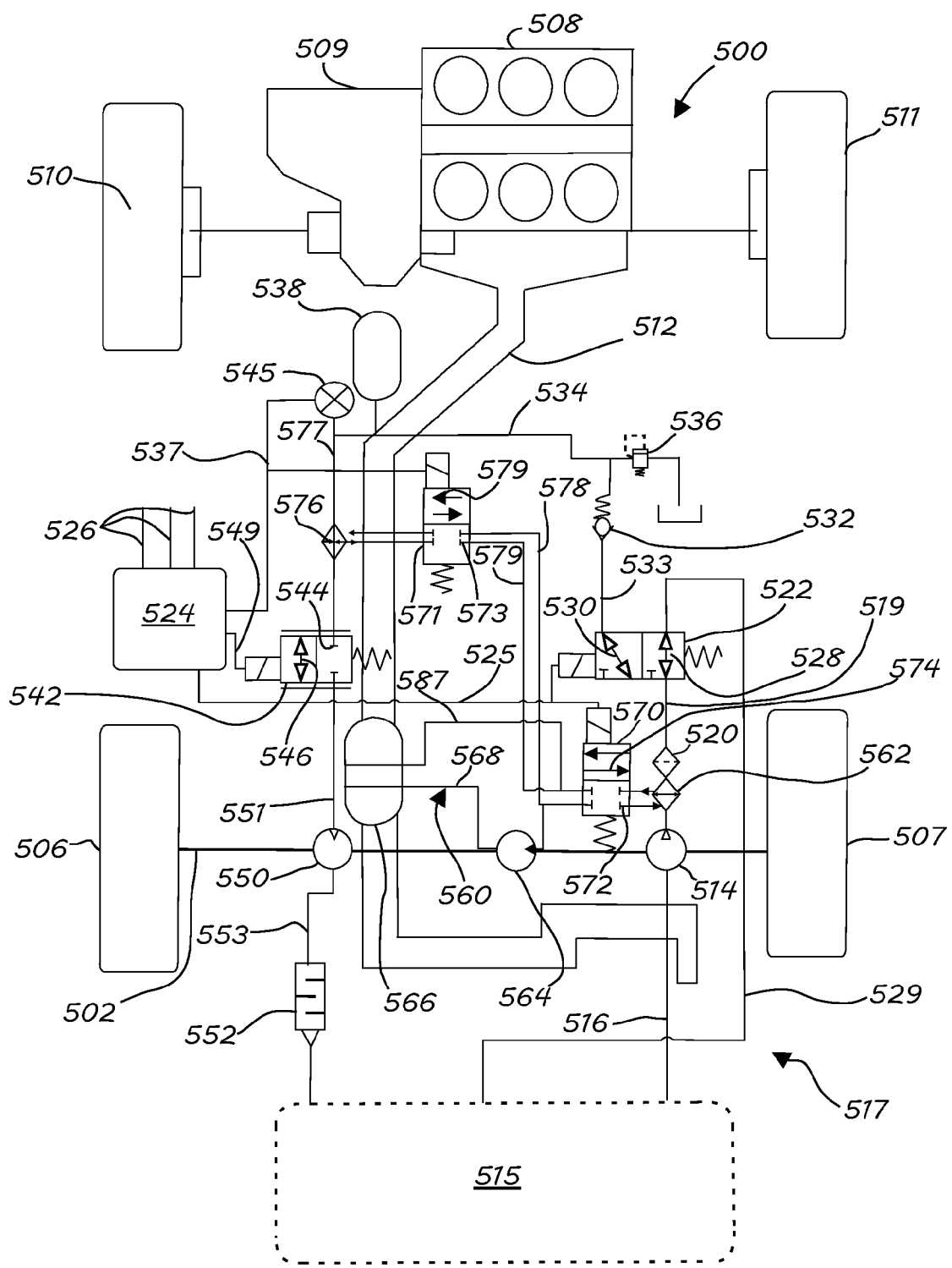
FIG. 13 is a schematic illustration of a regenerative energy system according to a number of variations.

Referring to FIG. 13, a regenerative energy system 500 according to a number of variations may be associated with an axle 502 that may include a differential. Wheels 506 and 507 may be connected to the drive axle 502. The vehicle may have an engine 508 with a transaxle 509 for driving the wheels 510, 511. The engine 508 may have an exhaust system 512 for conveying combustion gases from the engine 508 to the rear of the vehicle.

A pressurized fluid circuit 517 may include a compressor 514 which draws air from the atmosphere 515 through a line 516. The compressor 514 may be driven by the axle 502 and may deliver pressurized gas through a line 519 that may include a filter 520, to a control valve 522. The control valve 522 may include an actuator that is in communication with a controller 524 through a conductor bundle 525. The controller 524 may include conductors 526 for interconnection with a power supply and return or ground, and with the vehicle's electronic network through which the controller may receive and send information.

The control valve 522 may direct compressed gas back to atmosphere 515 through the path 528 and the line 529, or may direct compressed gas to the check valve 532 through the path 530 and the line 533. When gas is directed through the path 528 back to atmosphere 515, the compressor may do little to no work. When the control valve 522 may be actuated to direct flow through the path 530, the outlet from the compressor may be throttled to cause the compressor 514 to impart a braking action to the axle 502. Flow directed through the check valve 532 continues to line 534, which may be provided with a pressure relief valve 536.

The line 534 may be connected to an energy storage device in the form of a canister 538. The canister may have a capacity of five liters and may store compressed gas at up to 500 bar. Pressurized gas may be maintained in the storage canister 538 between the check valve 532 and a control valve 542 which is normally closed at 544.

A pressure sensor 545 may be provided in line 534 to monitor the fluid pressure and communicate readings to controller 524 through a conductor bundle 537. The control valve 542 may be in communication with the controller 524 through a conductor 549 for selective actuation to allow fluid pressure to be transmitted though path 546 and on through a line 551 to a motor 550, to impart rotation to the axle 502. Exhaust gas may be expelled from the motor 550 through a line 553 which may include a silencer 552, to the atmosphere 515. Through the foregoing pressurized fluid circuit 517 braking energy may be capturing and redeployed. Heat may be generated during compression of the gas.

Heat generated during compression by the compressor 514 may be captured and redeployed to increase efficiency of the pressurized fluid circuit 517 through a liquid circuit 560. Heat may be captured through a cooler 562 disposed in the line 519 near the outlet of the compressor 514. Liquid in the liquid circuit 560 may be circulated by a pump 564 driven by the axle 502. The pump may draw liquid from a reservoir 566 through a line 568. The reservoir 566 may be surrounded by an enclosure through which exhaust gas from exhaust system 512 may be routed to heat the liquid, or heat from the exhaust gas may be otherwise transferred to the liquid.

Two control valves 570 and 571 may be normally closed at 572 and 573 to isolate the reservoir 566. The control valve 570 may be selectively actuated by the controller 524 to open the flow path 574 so that the pump 564 may circulate liquid through the cooler 562 to extract heat and send it to the reservoir 566 entrained in the compressed gas. A heater 576 may be provided in the line 577 leading to the control valve 542 to selectively heat compressed gas prior to being supplied to the motor 550. The control valve 571 may be selectively actuated by the controller 524 to open the flow path 579. The pump 564 may then deliver heated liquid through line 578 to the heater 576 to transfer heat to the compressed gas in line 577. The liquid may return to the reservoir 566 through the control valve 571, the line 579 and the line 587.

Figure 14:
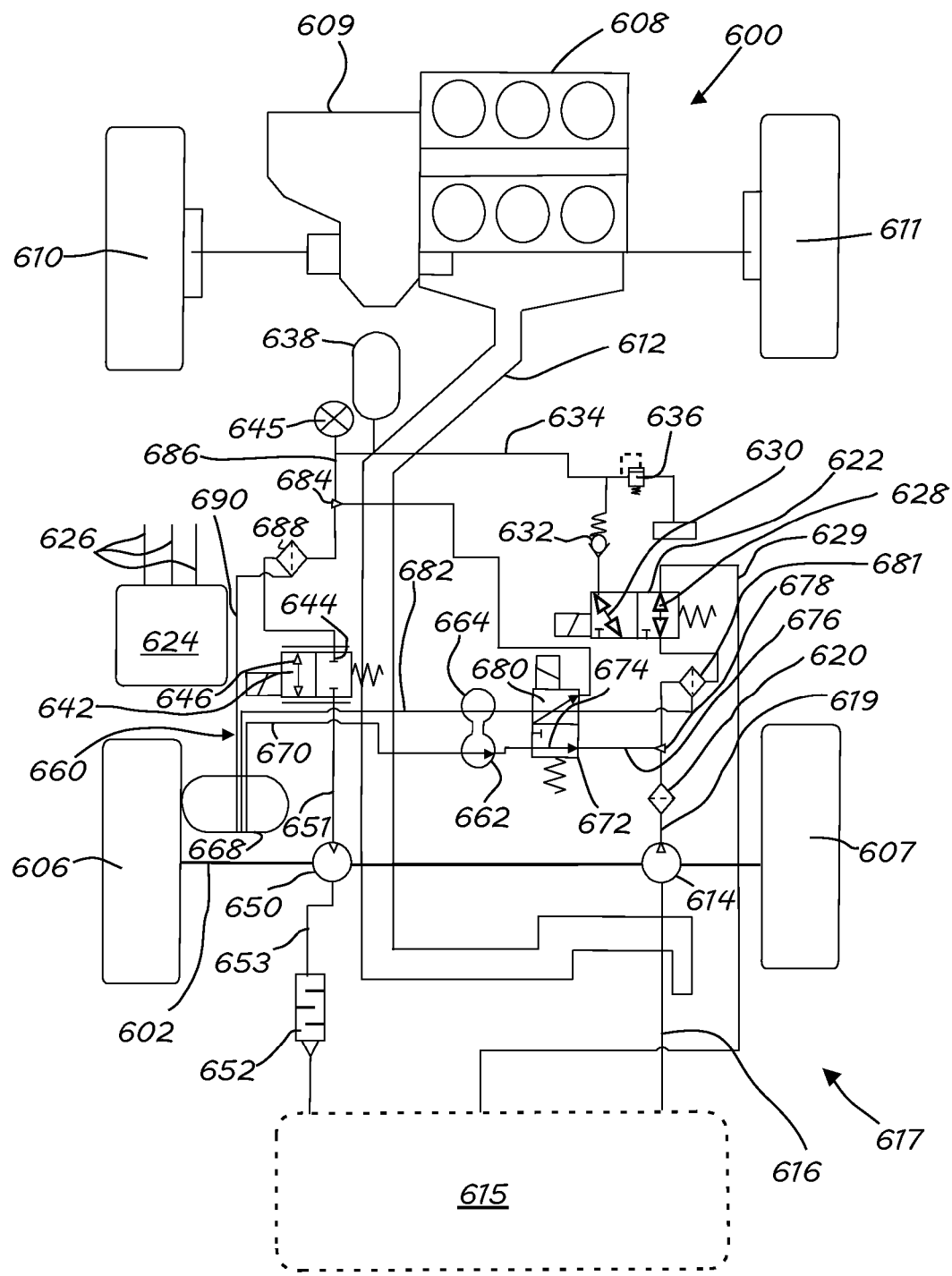
FIG. 14 is a schematic illustration of a regenerative energy system according to a number of variations.

Referring to FIG. 14, a regenerative energy system 600 according to a number of variations may be associated with an axle 602 that may include a differential. Wheels 606 and 607 may be connected to the drive axle 602. The vehicle may have an engine 608 with a transaxle 609 for driving the wheels 610, 611. The engine 608 may have an exhaust system 612 for conveying combustion gases from the engine 608 to the rear of the vehicle for expulsion.

A pressurized fluid circuit 617 may include a compressor 614 which draws air from the atmosphere 615 through a line 616. The compressor 614 may be driven by the axle 602 and may deliver pressurized gas through a line 619 that may include a filter 620, to a control valve 622. The control valve 622 may include an actuator that is in communication with a controller 624 through a conductor (not shown). The controller 624 may include conductors 626 for interconnection with a power supply, with a return or ground, and with the vehicle's electronic network through which the controller may receive and send information.

The control valve 622 may direct compressed gas back to atmosphere 615 through the valve path 628 and the line 629, or may direct compressed gas to the check valve 632 through the valve path 630. When gas is directed through the path 628 back to atmosphere 615, the compressor may do little to no work. When the control valve 628 may be actuated to direct flow through the path 630, the outlet from the compressor may be throttled to cause the compressor 614 to impart a braking action to the axle 602. Flow directed through the check valve 632 may now continue to line 634, which may be provided with a pressure relief valve 636.

The line 634 may be connected to an energy storage device in the form of a canister 638. The canister 636 may have a capacity of five liters and may store compressed gas at up to 500 bar. Pressurized gas may be maintained in the storage canister 638 between the check valve 636 and a control valve 642 which is normally closed at 644.

A pressure sensor 645 may be provided in line 634 to monitor the fluid pressure and communicate readings to controller 624 through a conductor (not shown). The control valve 642 may be in communication with the controller 624 through a conductor (not shown), for selective actuation to allow fluid pressure to be transmitted though path 646 and on through a line 651 to a motor 650, to impart rotation to the axle 602. Exhaust gas may be expelled from the motor 650 to the atmosphere 615 through a line 653, which may include a silencer 652. Through the foregoing pressurized fluid circuit 617, braking energy may be capturing and redeployed. Heat may be generated during compression of the gas.

Heat generated during gas compression by the compressor 614 may be captured and redeployed to increase efficiency of the pressurized fluid circuit 617 through a liquid circuit 660 within which liquid may be introduced into the compressed gas in the form of spray or foam. The liquid circuit 660 may include a pump 662 driven by a motor 664. The motor 664 may be connected with the controller 624 through a conductor (not shown), for selective operation. The pump 662 may draw liquid from a reservoir 668 through a line 670. The pump 662 may deliver liquid to a control valve 672, which in its normal position is open through the path 674 to a line 676. The line 676 may be connected to an application device such as a nozzle 678 in line 619 to apply liquid into the compressed gas stream exiting the compressor 614. Heat may transfer from the compressed gas to the applied liquid which may then be separated at separator 681 and returned to the reservoir 668 through a line 682, while the compressed gas continues on to the control valve 622.

The collected heat in reservoir 668 may be used through select actuation of control valve 672 to connect the path 680 with the pump 662. This may direct output from the pump 662 through a line 682. The line 682 may be connected through the control valve 672 to an application device such as a nozzle 684 in line 686 to apply liquid into the compressed gas stream before delivery to the motor 650. Stored heat may transfer to the compressed gas from the applied liquid which may then be separated at separator 688 and returned to the reservoir 668 through a line 690, while the compressed gas continues on to the control valve 642. Through the foregoing compressed fluid circuit 617, a mechanism is provided for capturing and redeploying braking energy, with the use of compression generated heat to raise the temperature of the compressed gas, increasing efficiency.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a product for storing and using energy selectively delivered through a drive wheel in a vehicle with an exhaust system. A rotatable element may be connected to the drive wheel to rotate therewith. A first rotating mechanism may provide an input energy when rotated by the rotatable element. A storage device may receive and store the input energy. A second rotating mechanism may rotate in reaction to selective delivery of the input energy from the storage device to the second rotating mechanism. The second rotating mechanism may selectively rotate the rotatable element. The rotatable element may be adapted to rotate in a first rotational direction to rotate the first rotating mechanism. The rotatable element may be adapted to rotate in the first rotational direction when rotated by the second rotating mechanism. A heat transfer device may surround at least a part of the storage device, wherein the exhaust system may be routed through the heat exchange device to heat the storage device and increase stored energy.

Variation 2 may include a product according to variation 1 wherein the storage device may have an input side and an output side. The input side may receive input from the rotatable element when a windup clutch disposed between the rotatable element and the storage device is closed. A one-way clutch may be disposed between the windup clutch and the storage device. The one-way clutch may be adapted to enable the rotatable element to deliver energy to the storage device and to prevent the storage device from transferring energy to the rotatable element.

Variation 3 may include a product according to variation 1 wherein the first rotating mechanism may include an outlet circuit and wherein the second rotating mechanism may include an intake system. A liquid circuit may comprise a cooling device disposed in the outlet circuit and a heating device disposed in the intake system. The liquid circuit may be routed through the cooling device and the heating device to transfer heat from the outlet circuit to the intake system.

Variation 4 may include a product according to variation 1 or 2 wherein a planetary gear set may be connected between the rotatable element and an output side of the storage device. The planetary gear set may be configured to decrease a rotational speed.

Variation 5 may include a product according to variation 4 wherein a gear set may be connected between the storage device and an input side of the rotatable element. The gear set may be adapted to decrease the rotational speed.

Variation 6 may include a product according to variation 1 or 3 wherein the storage device comprises a pressure tank.

Variation 7 may include a product according to any of variations 1, 2, 4 or 5 wherein the storage device may comprise a torsion element that may be wound by the first rotating mechanism.

Variation 8 may include a product according to any of variations 1, 2, 4 or 5 wherein the storage device may comprise a spring, wherein the spring is compressed by operation of the rotatable element.

Variation 9 may include a product for use with a vehicle having a drivetrain. A rotatable shaft may be engaged with the drivetrain. A storage device may receive a rotational input from the rotatable shaft and may provide a rotational output to the rotatable shaft. A first gear set may connect the rotatable shaft to the storage device. The first gear set may be driven by the rotatable shaft, and may drive the storage device. A windup clutch may selectively engage the rotatable shaft with the first gear set. The rotatable shaft may selectively wind the storage device through the windup clutch and the first gear set. A second gear set may be driven by the storage device. An output clutch may selectively connect the second gear set with the rotatable shaft. The storage device may selectively rotate the rotatable shaft through the second gear set and the output clutch.

Variation 10 may include a product according to variation 9 wherein the rotatable shaft may be capable of rotating in only one rotational direction.

Variation 11 may include a product according to variation 9 or 10 wherein the drivetrain may include an axle. The storage device may comprise multiple storage devices disposed around the axle in a circular pattern.

Variation 12 may include a product according to any of variations 9 through 11 wherein the vehicle may include an exhaust system. An enclosure may surround at least a part of the storage device. The exhaust system may be routed through the enclosure to heat the storage device.

Variation 13 may include a product according to and of variations 9 through 12 wherein the storage device may comprise a spring and wherein the spring may be compressed by rotation of the drivetrain.

Variation 14 may include a product according to variation 13 wherein the spring is a pneumatic spring Variation 15 may include a product according to any of variations 9 through 12, wherein the storage device may comprise a torsion element that may be wound by the drivetrain.

Variation 16 may include a product for storing and using energy through an axle of a vehicle that has a heat generating device. A compressor may be driven by the axle to compress a fluid. A storage device may receive the fluid. A motor may rotate in reaction to selective delivery of the fluid from the storage device to the motor to selectively rotating the axle. The axle may be adapted to rotate in a first rotational direction to rotate the compressor. The axle may be adapted to rotate in the first rotational direction when rotated by the motor. The fluid may be heated by the heat generating device prior to delivery to the motor Variation 17 may include a product according to variation 16 and may include an exhaust system routed from the heat generating source. An enclosure may surround at least part of the storage device and the exhaust system is routed through the enclosure to heat the storage device Variation 18 may include a product according to variations 16 or 17 wherein the compressor may include an intake system. A drying device may be disposed in the intake system. The exhaust system may be routed to the drying device to heat the drying device.

Variation 19 may include a product according to any of variations 16 through 18 wherein the motor may include an intake system. A liquid circuit may transfer heat from the heat generating device to the intake system.

Variation 20 may include a product according to variation 19 wherein the compressor may include an outlet circuit. A cooling device may be disposed in the outlet circuit. The liquid circuit may be routed through the cooling device.

The above description of select variations within the scope of the invention is merely illustrative in nature and, thus, variations or variants thereof are not to be regarded as a departure from the spirit and scope of the invention.

What is claimed is:

1. A regenerative energy storage system comprising:
    an engine with an exhaust system conveying exhaust gases from the engine;
    a drive wheel with a rotatable axle connected to the drive wheel to rotate therewith;
    one of a compressor or a pump providing an input energy when rotated by the rotatable axle;
    a storage canister receiving and storing the input energy;
    a motor that rotates in reaction to selective delivery of the input energy from the storage canister to the motor, the motor selectively rotating the rotatable axle;
    the rotatable axle adapted to rotate to rotate the compressor or pump, the rotatable axle adapted to rotate when rotated by the motor; and
    the exhaust system surrounding at least a part of the storage canister, wherein the exhaust system heats the storage canister increasing stored energy therein.

2. The regenerative energy storage system according to claim 1 wherein the storage canister has an input side and an output side, the input side receiving input from the compressor or pump through a first control valve disposed between the compressor or the pump and the storage canister, wherein a check valve is disposed between the first control valve and the storage canister wherein the check valve is adapted to enable the compressor or pump to deliver energy to the storage canister and to prevent the storage canister from transferring energy through the first control valve to the compressor or pump.

3. The regenerative energy storage system according to claim 1 wherein the compressor or pump includes an outlet circuit and wherein the motor includes an intake system and further comprising a liquid circuit comprising a cooler disposed in the outlet circuit and a heater disposed in the intake system, wherein the liquid circuit is routed through the cooler and the heater to transfer heat from the outlet circuit to the intake system.

4. The regenerative energy storage system according to claim 3 further comprising a reservoir connected in the liquid circuit between the cooler and the heater to receive heat extracted from the outlet circuit by the cooler, wherein the reservoir is surrounded by the exhaust system.

5. The regenerative energy storage system according to claim 4 wherein the liquid circuit includes a second pump connected between the reservoir and the heater, that draws liquid from the reservoir and sends liquid to the heater.

6. The regenerative energy storage system according to claim 1 wherein the compressor or pump is connected with the storage canister through a control valve, wherein the control valve has a first position that connects the compressor or pump with the storage canister, and has a second position that connects the compressor or pump with atmosphere.

7. The regenerative energy storage system according to claim 1 further comprising a tank, wherein the compressor or pump is connected with the storage canister through a control valve, wherein the control valve has a first position that connects the compressor or pump with the storage canister and has a second position that connects the compressor or pump with the tank.

8. The regenerative energy storage system according to claim 1 wherein the engine drives a pair of wheels that are separate from the drive wheel.

9. A regenerative energy storage system usable with a vehicle having a drivetrain, the regenerative energy storage system comprising:
   a rotatable shaft engageable with the drivetrain;
   a storage device receiving a rotational input from the rotatable shaft and providing a rotational output to the rotatable shaft;
   a first gear set connecting the rotatable shaft to the storage device, the first gear set driven by the rotatable shaft, and the first gear set driving the storage device;
   a windup clutch selectively engaging the rotatable shaft with the first gear set, the rotatable shaft selectively winding the storage device through the windup clutch and the first gear set;
   a second gear set driven by the storage device;
   an output clutch selectively connecting the second gear set with the rotatable shaft, the storage device selectively rotating the rotatable shaft through the second gear set and the output clutch.

10. The regenerative energy storage system according to claim 9 wherein the rotatable shaft rotates in only one rotational direction relative to the drivetrain, and further comprising a one way clutch engaged with the rotatable shaft and the output clutch, wherein the one way clutch freewheels when driven by the rotatable shaft without transferring torque from the rotatable shaft to the output clutch.

11. The regenerative energy storage system according to claim 9 wherein the drivetrain includes an axle connected to a drive wheel and wherein the storage device comprises multiple storage devices disposed around the axle in a circular pattern.

12. The regenerative energy storage system according to claim 11 wherein the vehicle includes an exhaust system and further comprising an enclosure surrounding at least a part of the multiple storage devices, wherein the exhaust system is routed through the enclosure to heat the multiple storage devices.

13. The regenerative energy storage system according to claim 9 wherein the storage device comprises a spring and wherein the spring is compressed by rotation of the drivetrain.

14. The regenerative energy storage system according to claim 13 wherein the spring is a pneumatic spring.

15. The regenerative energy storage system according to claim 9 wherein the storage device comprises a torsion spring or filament that is wound by the drivetrain.

16. A regenerative energy storage system for storing and using energy through an axle of a vehicle that has an engine that propels the vehicle, the regenerative energy storage system comprising:
   a compressor driven by the axle to compress a fluid;
   a storage canister receiving the fluid;
   a motor that rotates in reaction to selective delivery of the fluid from the storage canister to the motor, the motor selectively rotating the axle;
   the axle adapted to rotate the compressor, the axle adapted to be rotated by the motor; and
   wherein the engine has an exhaust system and the fluid is heated by the exhaust system prior to delivery to the motor.

17. The regenerative energy storage system according to claim 16 further comprising an enclosure, wherein the enclosure surrounds the storage device and the exhaust system is routed through the enclosure to heat the storage device.

18. The regenerative energy storage system according to claim 17 wherein the compressor includes an intake system and further comprising a dryer disposed in the intake system and wherein the exhaust system is routed to the dryer to heat the dryer.

19. The regenerative energy storage system according to claim 16 wherein the motor includes an intake system and further comprising a liquid circuit wherein the liquid circuit transfers heat from the exhaust system to the intake system.

20. The regenerative energy storage system according to claim 19 wherein the compressor includes an outlet circuit and further comprising a cooler disposed in the outlet circuit wherein the liquid circuit is routed through the cooler.

21. The regenerative energy storage system according to claim 9 wherein the storage device comprises a ball screw unit driven by the rotatable shaft, the ball screw unit having a second shaft, a ball nut assembly disposed on the second shaft, a stop disposed on the second shaft opposite the ball nut assembly, and a compression element disposed between the ball nut assembly and the stop, the second shaft engageable with the rotatable shaft and driving the ball nut assembly toward the stop to compress the compression element.

22. The regenerative energy storage system according to claim 9 further comprising a holding clutch engaged with the first gear set and holding the first gear set from rotating when the windup clutch disengages the first gear set from the rotatable shaft.

23. A regenerative energy storage system comprising:
   a first shaft;
   a second shaft;
   a windup clutch driven by the first shaft and selectively actuated to engage the first shaft with the second shaft;
   a ball screw unit driven by the second shaft, the ball screw unit having a third shaft, a ball nut assembly disposed on the third shaft, a stop disposed on the third shaft opposite the ball nut assembly, and a compression element disposed between the ball nut assembly and the stop, the second shaft engageable with the first shaft and driving the ball nut assembly toward the stop to compress the compression element;
   a holding clutch engaged with the second shaft selectively preventing rotation of the second and third shafts, maintaining compression of the compression element;
   an output clutch driven by the third shaft and selectively actuated to engage the third shaft with the first shaft, the third shaft driving the first shaft through the output clutch when the holding clutch is opened.

24. The regenerative energy storage system according to claim 23 further comprising a planetary gear set engaged between the third shaft and the output clutch.

25. The regenerative energy storage system according to claim 24 wherein the planetary gear set reverses rotation between the third shaft and the first shaft.

26. The regenerative energy storage system according to claim 23 wherein the compression element comprises a stack of Belleville discs.

27. The regenerative energy storage system according to claim 23 wherein the compression element comprises a pneumatic chamber.

28. The regenerative energy storage system according to claim 23 wherein the compression element comprises a stack of Belleville discs in combination with a pneumatic chamber.

29. The regenerative energy storage system according to claim 23 wherein multiple ball screw units are disposed around the first shaft, each engageable with the first shaft through the windup clutch and the output clutch, each of the multiple ball screw units compressing separate compression elements.

30. The regenerative energy storage system according to claim 29 further comprising an engine having an exhaust system conveying exhaust gases from the engine, wherein the exhaust system is routed over the multiple ball screw units to heat the separate compression elements and increase energy storage.

* * * * *